(12) United States Patent
Santic

(10) Patent No.: US 7,069,174 B2
(45) Date of Patent: Jun. 27, 2006

(54) EVALUATING METHOD FOR TESTING OF SIMPLE GEOMETRY AND COMPLETE GAUGING OF THE WORK PIECES WITH DEFINED TOLERANCE ZONES

(76) Inventor: Blaz Santic, Muehlstr. 24, D 86199 Augsburg (DE)

( * ) Notice: Subject to any disclaimer, the term of this patent is extended or adjusted under 35 U.S.C. 154(b) by 389 days.

(21) Appl. No.: 10/402,411

(22) Filed: Mar. 31, 2003

(65) Prior Publication Data

US 2003/0236645 A1 Dec. 25, 2003

(51) Int. Cl.
*G01C 9/00* (2006.01)
*G06F 15/00* (2006.01)
*G06K 9/32* (2006.01)
*G01V 1/13* (2006.01)

(52) U.S. Cl. .......................... 702/153; 367/73; 382/293
(58) Field of Classification Search ................... 702/14, 702/82, 153; 704/219; 708/300; 341/120; 342/200; 382/293; 367/73; 351/221
See application file for complete search history.

(56) References Cited

U.S. PATENT DOCUMENTS 6,388,947 B1 * 5/2002 Washbourne et al. ......... 367/73
2003/0044085 A1 * 3/2003 Dial et al. .................. 382/293

* cited by examiner

*Primary Examiner*—John Barlow
*Assistant Examiner*—John Le
(74) *Attorney, Agent, or Firm*—Harrison & Egbert

(57) ABSTRACT

An integral evaluation method for a complete numerical gauging of work pieces includes building an integral objective as a polynomial composed of two different objective groups and multiplying each group of the objectives with different free adjustable weighing parameters. The objective groups are Chebychev objectives group and a least-squares objectives group. The free adjustable weighing parameters include all prescribed connections between the elements with a tolerance requirements according to a drawing of the elements and a weighing of the elements.

9 Claims, 6 Drawing Sheets

Fig. 8
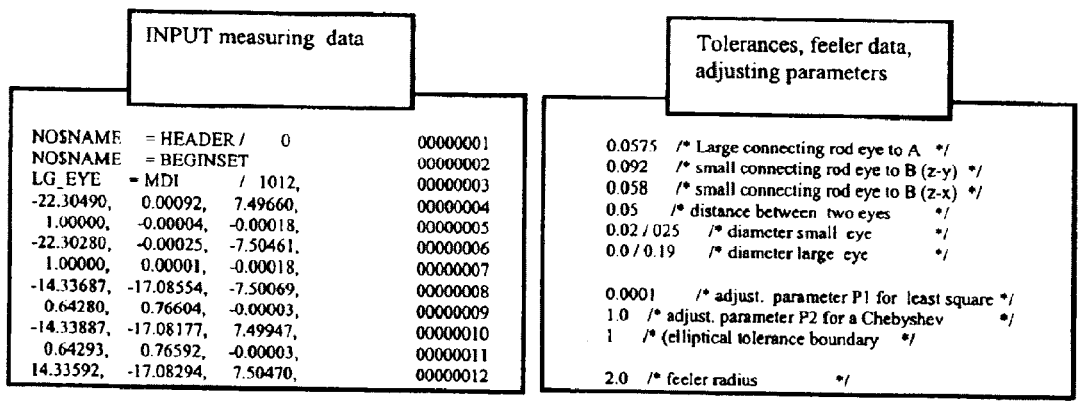
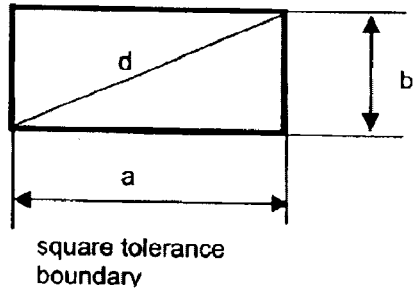
square tolerance boundary
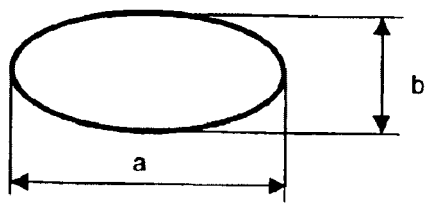
Fig. 9
elliptical tolerance boundary `# EVALUATING METHOD FOR TESTING OF SIMPLE GEOMETRY AND COMPLETE GAUGING OF THE WORK PIECES WITH DEFINED TOLERANCE ZONES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

Field of application of new method is geometry quality control on Co-ordinate Measuring Machines (CMM) in automotive and machinery building industry, in plastic forming etc, for the evaluation (computation) of individual geometric elements and of the work pieces composed of several standard geometrical elements from the measuring 3-dimensional-points, within of all required tolerance conditions according to ISO 2692 (Technical Drawings-Geometrical Tolerancing-Maximum-Material-Principle), such as form, distance, inclination and so on.

The method can be also used for further investigations of margin and stability conditions of the Chebyshev method.

BACKGROUND OF THE INVENTION

The present invention relates to an on-line numerical geometry evaluation method for computation of the particulars standard geometric elements or for complete gauging of the work pieces or parts of work pieces composed of several standard geometrical elements such as cylinders, planes, spheres, cones or torus, combined with or connected to one another with free orientation in the 3-dimensional space, within of all required tolerance conditions according to standards ISO 1101 [1] and ISO 2692 [2] (and beyond of that standard—with tolerances in the elliptically range), such as form, distance, inclination and so on, whereby the measuring points can be given in the Cartesian, spherical, cylindrical or any other coordinate system for which the number of the measuring points is much larger than that of the searched parameters.

The direct application of Chebyshev method is not satisfactory enough in the case of some CMM measurements. This problem is present on non-precise parts of work pieces and in measurements with scanning robots or coordinate measuring machines with lower accuracy.

An another problem is evident during the measurement of the plastic work pieces or measurements on CMM controlled by hand. There are the geometrical deviations present in such a manner, that the Chebyshev method is limited applicable.

By scanning machines controlled by hand beside the well-known effects, acceleration forces and inaccuracies caused by bending, torsion etc., the still following effects are to be considered to, the forces, which are caused by the operator (with linear and rotary motion with different speeds and forces still combined in different directions)

radial clearance in many bearings impact and movement without jerking acceleration forces including impulse and wind up.

Overlaid deformations of the mechanism caused with all these different forces and moments in different directions, inclusive the hysteresis with some inductive measuring heads by fast change of the direction and size of the forces is caused, can together impair the accuracy such of a robot or a similar measuring machine in such a manner, that despite all corrections measuring errors cause a measurement inaccuracy more largely than 10 micrometers. A conventional direct evaluation according to Chebyshev or the form examination are thus hardly possible. The repetition accuracy with same operator of the measuring machine cannot never be given.

The constant corrections, in particular the bracket and bending corrections of the measuring points as well as constant transformations and inverse transformations of the measuring points during the evaluation, place an additional degradation of the results of measurement.

Many errors, which are caused by hardware, change the true form of the measured surface, with the consequence that to many points of the "filtering criteria" become trapped. As remedial measures fast different filtering were found.

By an method for integrally evaluation of the work pieces, it is foreseen to apply the evaluating principles only either as the integral sum of least squares (Gauss) of all elements (of the body), or as the integral Chebyshev solution (minimum the largest distance between measuring points to the geometric elements respectively of the body). This method is very stable if only least squares (Gauss) method is applied. With the Chebyshev method and by using in the measuring robots or similar measuring machines by non-precise measurement, the same difficulties are present as are described above.

Furthermore in that method are beside a circular form still the squarely and symmetric tolerance ranges foreseen.

The squarely tolerance range form permits that the maximum deviation, which lies in the diagonal such of a square is, larger than everyone of the two regarded tolerance (sides of a square), see FIG. 9.

The non-symmetrical tolerance fields are however required and are very frequent into the tolerating. The elliptical tolerance are very rarely requested in the opposite, although only they can guarantee a perfect maximum allowable deviation.

BRIEF SUMMARY OF THE INVENTION

It is therefore the object of the invention to create an evaluation method which is very reliable, with single result, user-friendly and repeatable, suitable for precise and non-precise measurements on CMM for the geometry test of the standard elements as wheel as of the bodies having of several geometric elements within the prescribed tolerance ranges, with which would calculate the previously parameters—which hardly differ from the exact Chebyshev parameters with help of which finally the norm-fair Chebyshev parameters can be quickly and reliable found.

Further this method should permit an evaluation of the symmetrical or non-symmetrical tolerance fields as well as the square or elliptical tolerance ranges.

In the following is described a solution, with which this problems may be successfully solved.

The basic idea was to mix an arbitrary small weighing of the least squares and Chebyshev methods.

It was found that all results of elements of any geometry converge like the least squares results. The results were repeatable and stable, independently of the measuring points dispersion. This can be explained with the astonishing particularity of the Chebyshev method to obtain a convergence direction by comprehending a secondary factor of an arbitrary small least-squares weighing part.

In this way, the global solution is guaranteed.

It should be noted that the absolute values of the adjusting parameters P1 and 2 are not important, but their relationship. The reciprocally influence of the both objective parts is always continual in full range—from the Chebyshev to the least squares and vice versa (FIGS. 1–2 and Table 1).

Furthermore, with help of the invention it can be shown that the direction vectors of most Chebyshevian elements can be inclined by a small angle and/or shifted to some small extent without having any practical effect on the best form.

This mentioned changing of the best Chebyshev elements is effected by setting a very small weighing of least-square parameter in the Chebyshev algorithm.

Depend on the dissipation and number of measuring points, the change of the form was hardly noticeable (see FIG. 3).

Lastly the new received parameters shall be set for the starting parameter in the Chebyshev subroutine. After a few improvement steps in the iteration, the global Chebyshev solution was found.

The not solvable problems according to Chebyshev becoming now solvable.

BRIEF DESCRIPTION OF THE SEVERAL VIEWS OF THE DRAWINGS

FIG. 8 is a table of input data by gauging of a connecting rod.

FIG. 9 is a schematic illustration of square and elliptical tolerance shapes.

Figure 1:
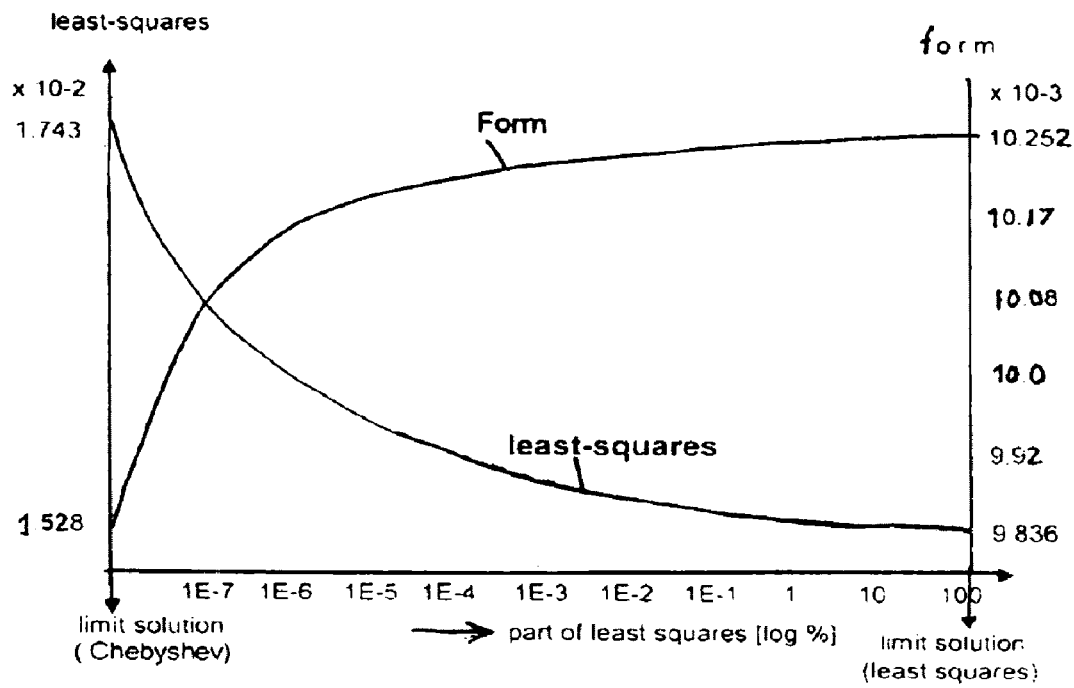
FIG. 1. is a graph illustrating the course of the form and the least squares depending on partition of the parameter P1, by a cylinder of radius 22.3 mm, height 20 mm, scanned with 7605 points.

Table 1 is a table showing a review of results computed for a cylinder.

DETAILED DESCRIPTION OF THE INVENTION

New Method

The new method makes it possible to find the single and precise limit solution (or any desired intermediate solution) either by the method of least squares or Chebyshev, by precise and non-precise parts of work pieces or by CMM measurements of lower accuracy.

The setting of P1 and P2 parameters can be a function of the surface quality of the work piece, or self-generated automatically in order to find the best possible norm-conform solution. It must be emphasized here that no intermediate solution is as good as the pure Chebyshev solution!

The most cases, which were previously defined as not solvable with direct application of the Chebyshev method, are solvable with very small part ($1/100000$) of least square in the common objective. The aberrance caused by such one small weighing of the least squares on the exact Chebyshev solution can be estimated only by the measuring data of the geometric elements with a small standard deviation and normal dissipation of measuring points. It can be proved, that the difference to the Chebyshev solution can be practically neglected.

On the other hand, the parameters of the geometric elements received by such a near method guarantee the quick and stable finding of the exact Chebyshev solution.

Regarding the influence of weighing of both parameters on the element's form, it is generally found, that the effect of the least squares weighing is much greater than Chebyshev weighing. This influence becomes larger with the increase of the number of measuring points. For that reason, it is advisable to set the increasing step of least squares parameter at 1/(No. of points×100) or less.

The new evaluation method takes advantage of both:

The method of least squares which is stable and single-defined, and

Chebyshev method for norm-conform minimization of the amount intervals.

It is assured that the method converges with both a minimum as well as a very high number of points. Furthermore, convergence happens with minimum as well as very large standard deviations. This is very important in the field of the production measuring techniques.

A secondary feature of the new method is a possibility of the testing as well the least squares (Gaussian) as the Chebyshev algorithm.

For testing of least square software, the free parameters P1 to be set on 1, while the parameter P2 should be increased from zero in very small steps. For testing of Chebyshev software, the free parameters P2 to be set on 1, while the parameter P1 should be changed from zero in very small steps. The results can be arranged in the tables or show in the diagrams, like FIGS. 1–3. If any maximum or minimum is present, there is an error in the software.4

New Evaluating Algorithm for a Simple Element

In the following the new evaluation algorithm for a simple element will be described in four steps.

It is recommended to use the simple, fast and flexible automatic computation of the starting parameters using one of the well known methods.

Step 1: Least Square Iterative Evaluation

The well-known objective of least squares of a geometric element measured by a sample of np measuring points, which is based on the objective function for the squares of the point distances $f_i$, reads as follows:

$$F \equiv \sum_{i=1}^{np} f_i^2 \Rightarrow \text{Min.}$$

Step 2: Norn-conform Best-fit Evaluation

The objective for a best-fit evaluation according to Chebyshev method reads as follows:

$$F \equiv |\nabla_0^{np}|_i \Rightarrow \text{Min}$$

There are a lot of existing best-fit evaluation methods according to well known Chebyshev, such as: Monte-Carlo method, Simplex-method and so called Lp approximation.

All these methods are suitable for combination with the least square method.

The objective of the Lp approximation reads as follows:

$$F \equiv \left(\sum_{i=1}^{n} f_i^p\right)^{1/p} \Rightarrow \text{Min.}$$

Where p is a large number.

Step 3: Evaluation of the New Method for a Simple Element

The following expressions describe the new evaluation algorithm.

The new common objective for a simple element is:

$$F \equiv P_1 \sum_{i=1}^{np} f_i^2 \Delta + P_2 |\nabla_0^n| + \lambda_1(\underline{\text{mat}}) \Rightarrow \text{Min.}$$

or with the Lp-approximation part:

$$F \equiv P_1 \sum_{i=1}^{np} f_i^2 + P_2 (\sum_{i=1}^{np} (f_i^p)^{1/p} + \lambda_1(\underline{\text{mat}}) \Rightarrow \text{Min.}$$

where P1 and P2 are adjusting parameters; p is a large number; $\Lambda_1$, is Lagrange multiplier; the expression (mat) is a mathematical necessary condition.

The equation (4) or (5) to be developed by the partial differentiation with respect to nine variables $a_i$, in a known system of the linear equations:

$$\underline{N} = A^T \cdot A; \, \underline{x} = -N^{-1} \cdot B,$$

where A is a determinante (Jacobiane), $\underline{B}$ is a vector.

Iterative solution of this system using of the Newton method is here not showed.

The evaluated parameters to be used as starting parameters for final step.

Step 4: Best-fit Evaluation using Norm-fair Method (2) or (3)

Since the results of the evaluation by using the previously steps hardly differ from the Chebyshev solution, it is obvious, only a few improvement steps in the iteration are needed to reach an exact Chebyshev solution.

Application of New Alogorithm for Testing of Work Pieces With Defined Tolerance Zones (Complete Gauging)

The importance of such an evaluation becomes visible by complete gauging of the work pieces. There it is absolutely necessary that all geometric elements must be norm-conform evaluated. Every one prescribed tolerated connection condition, which has been given in input, practically is acting as a restriction which inclines and/or shifts the axis of the best surface in the required direction. Since the different elements have different surface qualities and/or different marginal and connecting conditions, the direct application of the Chebyshev solution can not always be guaranteed. There it is further absolutely necessary that all geometric element must be stable on each improvement step during the iterative process of solving very large non-linear equations.

As previously mentioned, it was found that the direction vector of many standard geometric elements can be inclined by a very small angle and/or shifted by small amount and nevertheless its best Chebyshev form was practically not changed. This finding, proved by a complete gauging, enables a quality inspection of complex work pieces within tolerance zones as defined by [1, 2] with absolutely the least fault zones.

New Algorithm for a Workpiece

In the following the new evaluation algorithm for a work piece will be described in two steps.

Step I: Evaluation of the New Method for Testing a Work Piece

The new common fundamental objective for testing a work-piece under enveloping conditions is to minimize the polynomials consisting of several separate common objectives (one for each surface of the work piece with corresponding measuring points), wherein each part of the separate objectives (least squares and Chebyshev) is multiplied with the adjusting parameters P1 and P2, including the weighing factors according to importance of the surfaces and all necessary mathematical conditions as well as all prescribed connecting conditions between the surfaces with its tolerances in accordance with the drawing:

$$F \equiv P1 * \sum_{0}^{m} \{g_1 * (\Delta_1^2) + g_2 * (\Delta_2^2) + \ldots + g_m * (\Delta_m^2)\} +$$

$$P2 \sum_{0}^{m} \{g_1 |\nabla|_1 + g_2 |\nabla|_2 + \ldots + g_m |\nabla|_m\} +$$

$$\lambda_v(\underline{\text{mat}}_v) + \lambda_k(g_k \, \underline{\text{Con}}_k + \varphi_D + tol_k . \sin(\alpha_k)) \Rightarrow \text{Min.},$$

where P1 and P2 are adjusting parameters (multipliers), $$(\Delta_i^2) \text{ are } \sum_{0}^{np} f_i^2 \Rightarrow \text{Min.,}$$

a least squares partial objective for each one surface, $$|\nabla|_i = |\nabla_0^{np}|_i \Rightarrow \text{Min.,}$$

a best-fit objective for each of one m surface; np is number of the associated measured points for each element; k is number of the prescribed and tolerated connections; v is number of the necessary mathematical connections; $g_m$ are weighing factors of the individual surfaces according to their importance; $g_k$ are weighing factors of the individual conditions according to its importance; $\Lambda_v$, $\Lambda_k$ Lagrange multipliers; the expressions ($\text{mat}_v$) are mathematical necessary conditions; the expressions ($\text{Con}_k + \phi_D + \text{tol}_k \cdot \sin(\alpha_k)$) are prescribed connecting conditions of interrelated surfaces in accordance with the drawing; $\text{Con}_k$ are angle conditions (such as parallelism, orthogonality, inclination) or distance conditions between the interrelated surfaces in accordance with the drawing; $\phi_D$ average difference range of size or angle. If a prescribed tolerated range is not symmetrical, then it will be set at an average tolerance range and the eccentricity (positive or negative difference between the 0-value and the average value) will be added to the respectively prescribed size or angle condition; $\text{tol}_k$ are tolerance's ranges (boundaries) of the connections of interrelated surfaces in accordance with the drawing; $\alpha_k$ are auxiliary parameters ($0<\alpha_k<2\pi$), which also to be improved by iteration; $\sin(\alpha_k)$ sine or cosine function, with which to be ensured, that the prescribed tolerated range can not be exceeded.

The objective (7) to be developed in a well-known non linear equations system. Iterative solution of this system using of the Newton method is not shown here.

The evaluated parameters of all geometric elements to be used as starting parameters for Step II.

Step II: Best-fit Evaluation Using the Method for Testing of Work Pieces Using Complete Gauging The objective is to minimize the polynomial of the maximal deviations for m surface's objectives by Chebyshev, including all necessary mathematical conditions as well as all prescribed connecting conditions (relationships) between the surfaces with its tolerances in accordance with the drawing:

$$F \equiv \sum_{0}^{m} \{g_1|\nabla|_1 + g_2|\nabla|_2 + \ldots + g_m|\nabla|_m\} +$$
$$\lambda_v(\text{mat}_v) + \lambda_k(g_k \cdot \underline{\text{Con}}_k + \varphi_D + tol_k \sin(\alpha_k)) \Rightarrow \text{Min.},$$

where $|\nabla|_i = |\nabla_0^{np}|_i$

= an objective (minimize the maximal deviations for each of one m surface)

=an objective (minimize the maximal deviations for each of one m surface)

For the explanation of the expressions see Step 1.

Since the parameters of the geometric elements evaluated according to previously described method for testing a work piece hardly differ from the parameters according to Chebyshev solution for each geometric element, it is obvious, only a few improvement steps are needed to reach the exact Chebyshev solutions.

The new method is proven in practice with help of a software package program CMM-Integral.

This software shows the following features of new method:

Chebyshev method, reliable, repeatable and as unequivocal as the least-square principle Insensitive to wide scattering of measuring points Absolutely ideal for scanning measurements Range from minimum number to several thousand measuring points Up to several dozen elements and links with tolerances Not an adaptation but rather a genuinely new evaluation of Chebyshcv elements (restricted by the given and multiply 3-D tolerated linkage conditions throughout the complete work piece) as per ISO 2692

Tolerance links in all planes of projection in any shape (round, quadratic, elliptical, etc.)

No preparation necessary for fixing the workpiece in any desired way in the 3-D space No specialized knowledge necessary for operation and interpretation All that is needed is the interactive input of the measuring data and linkage requirement with associated tolerances.

With CMM-Integral, the necessary stability of testing can be adapted to suit the machining quality or material quality.

Description of the Figures

FIG. 1 shows the course of the form and the least squares depending on partition of the parameter P1, by a cylinder of radius 22.3 mm, height 20 mm, scanned with 7605 points. The changes of the form and least squares are fast but smooth and continuous in whole range from one to the other boundary solution.

Figure 2:
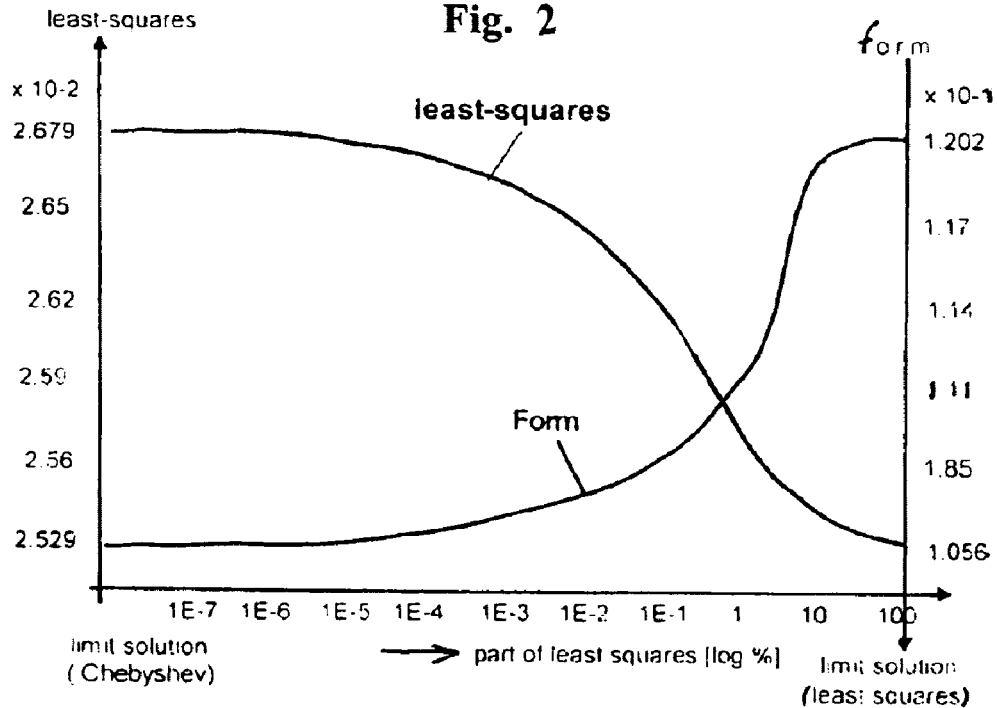
FIG. 2 is a graph illustrating the course of the form and the least squares depending on partition of the parameter P1, by a cylinder of radius 104.36 mm, height 230 mm, scanned with 25 points.

FIG. 2 shows the course of the form and the least squares depending on partition of the parameter P1, by a cylinder of radius 104.36 mm, height 230 mm, scanned with 25 points. The changes of the form and least squares are slow but smooth and continuous in whole range from one to the other boundary solution.

Figure 3:
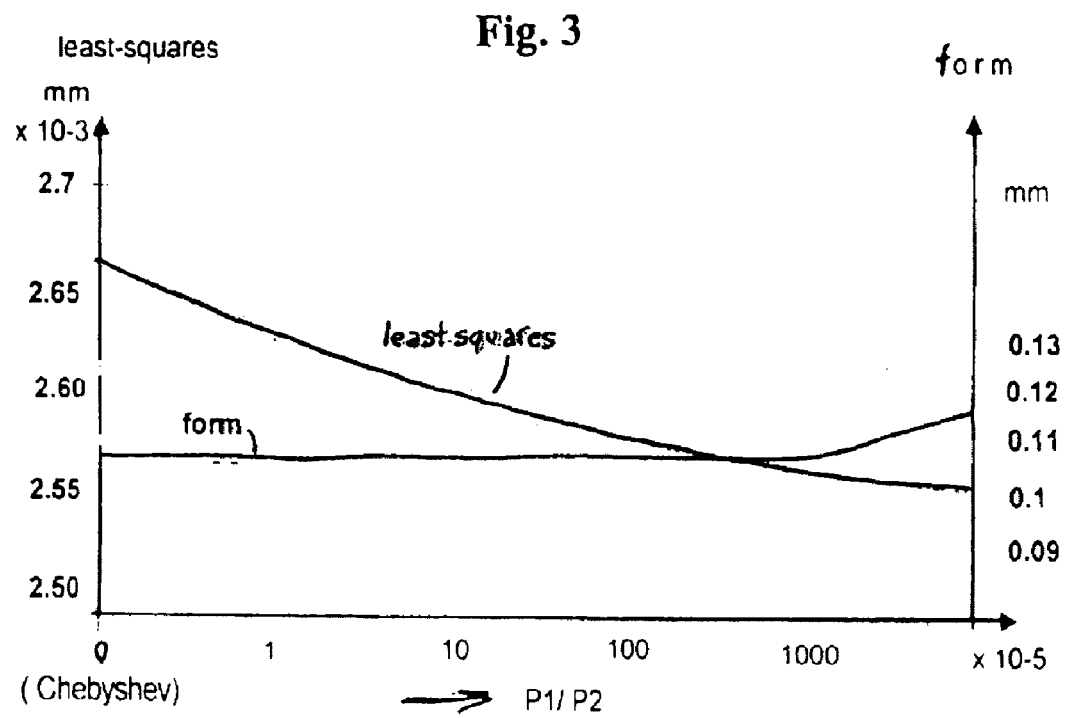
FIG. 3 is a graph illustrating the influence of weighing parameters P1/P2 on the cylinder form.

FIG. 3 shows the influence of weighing parameters P1/P2 on the cylinder form. The direction vectors of most Chebyshev elements can be inclined by a small angle and/or shifted to some small extent without having any practical effect on the best form. This changing of the best Chebyshev elements is effected by setting a very small weighing of least-square parameter in the Chebyshev algorithm. Depend on the dissipation and number of measuring points, the change of the form was hardly noticeable.

Figure 4:
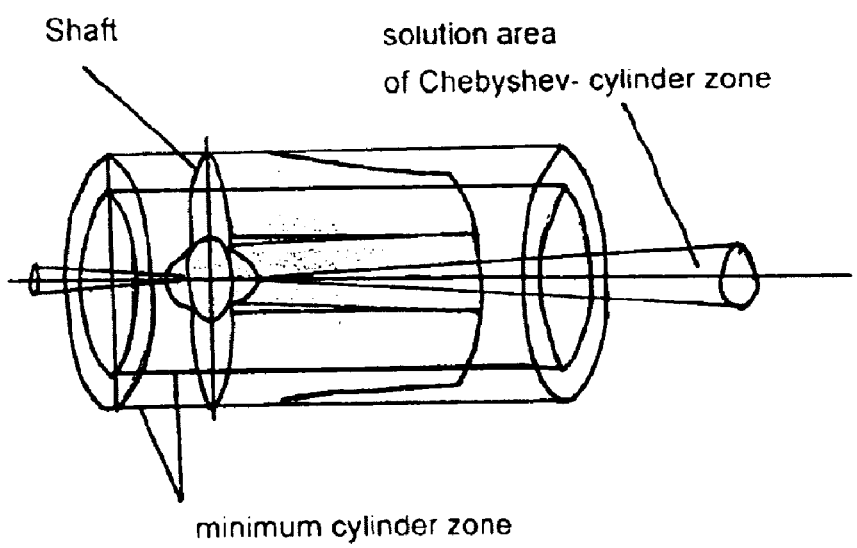
FIG. 4 is a schematic view showing insecurity of the Chebyshev solution by a special case.

FIG. 4 shows insecurity of the Chebyshev solution by a special case. The axis of the work piece can be inclined by a small angle in all direction without having any effect on the form. Which of the infinitely number of the solutions is a global solution remains unknown.

Figure 5:
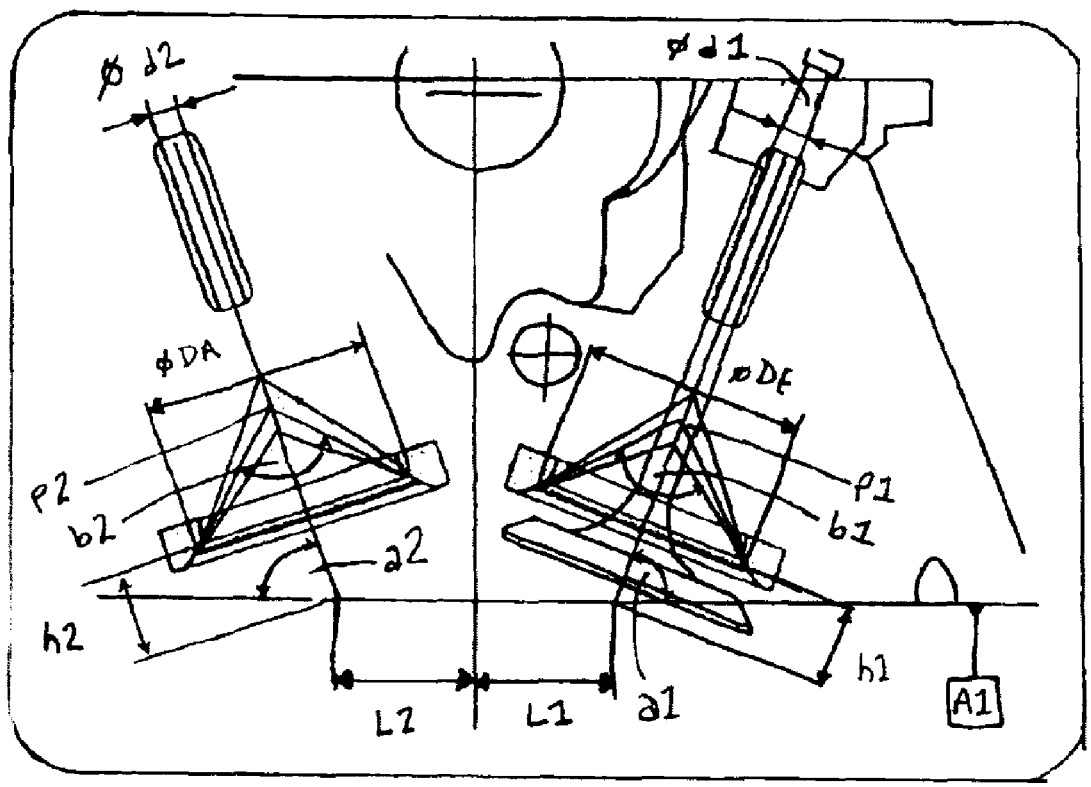
FIG. 5 is a schematic view of a complete gauging of a cylinder head.

FIG. 5 shows an example of the complete gauging of a cylinder head.

Figure 6:
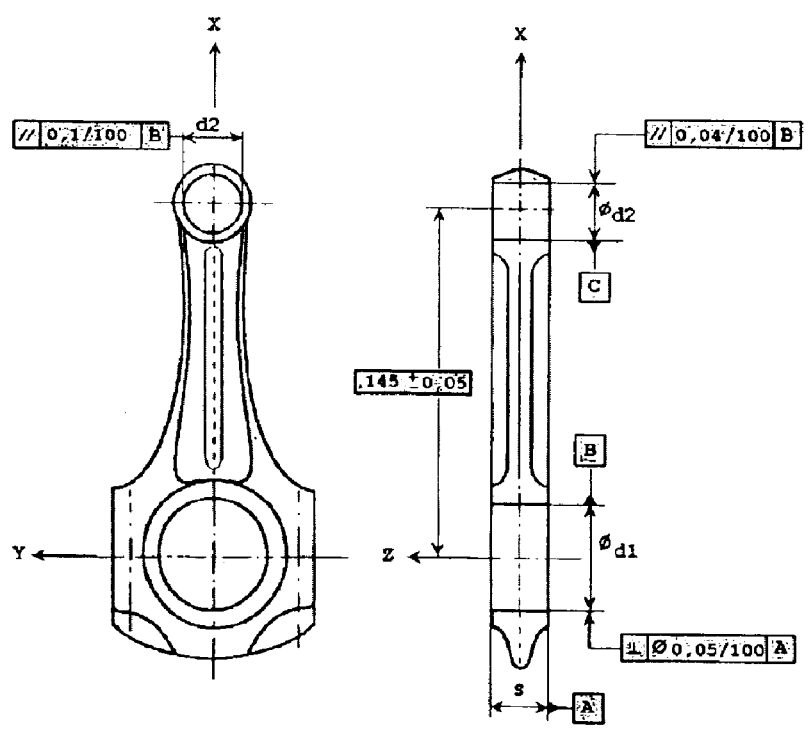
FIG. 6 is a schematic view of a complete gauging of a connecting rod.

FIG. 6 shows an example of the complete gauging of a connecting rod.

Figure 7:
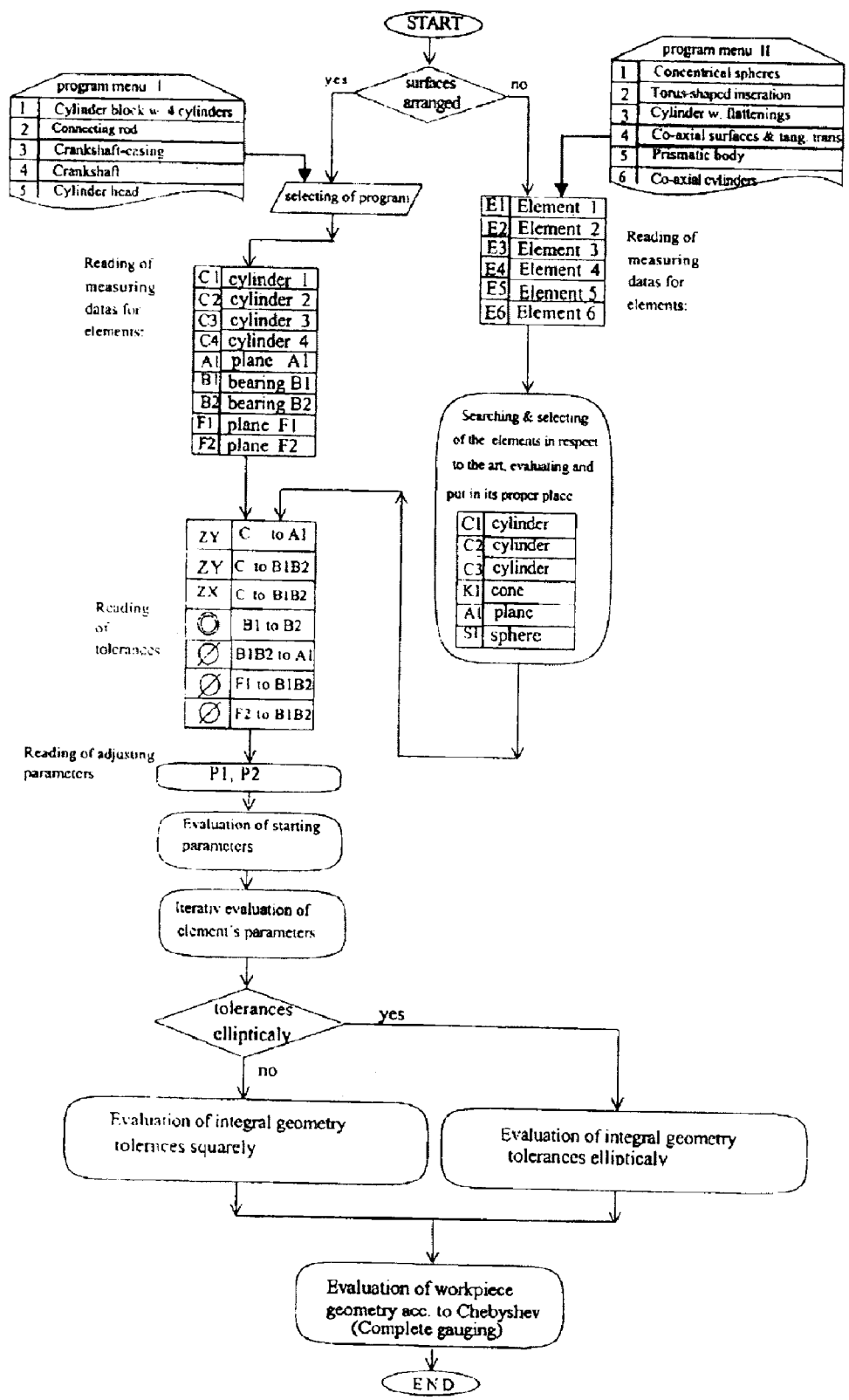
FIG. 7 is a flow chart for complete gauging of a work piece.

FIG. 7 shows a flow chart for complete gauging of a crankshaft casing selected from the program menu I realized into the software package CMM-Itnegral.

Table 1 shows a review of results computed for a cylinder. The change of the form by small least square parameters is hardly noticeable.

I claim:

1. A method for the numerical evaluation of standard geometry elements with free orientation in a three-dimensional space comprising the steps of;

giving measuring points in a coordinate system, a number of said measuring points being significantly larger than a number of searched parameters;

multiplying a Chebychev objective with a first free adjustable weighing parameter; and jointing said Chebychev objective with a least squares objective which is multiplied with a second free adjustable weighing parameter.

2. The method of claim 1, further comprising:

evaluating the searched parameters of the geometry element from a common objective.

3. An integral evaluation method for a complete numerical gauging of work pieces or parts of work pieces composed of several standard geometrical elements with free orientation in three-dimensional space for which a number of measured points of each elements is significantly larger than a number of searched parameters for the element, the method comprising the steps of:

building an integral objective as a polynomial composed of two different objective groups, said two different objective groups being a Chebychev objectives group of all elements and at least-squares objectives group of all elements;

multiplying each group of the objectives with different free adjustable weighing parameters, said free adjustable weighing parameters including all prescribed connections between the elements with a tolerance requirements for forms and dimensions and connection conditions of the elements according to a drawing of the element and a weighing of the elements in accordance with importance thereof.

4. The method of claim 3, further comprising:

evaluating the searched parameters from the integral objective.

5. The method of claim 3, further comprising:

automatically changing the free adjustable weighing parameters in very small steps into an entire range beginning from a Chebychev solution in a direction to a least squares solution until a first evaluation solution is reached.

6. The method of claim 3, further comprising:

automatically charging the free adjustable weighing parameters of the objectives group in very small steps into an entire range from a Chebychev solution toward a least squares solution until a first evaluation solution of complete gauging is reached.

7. The method of claim 3, further comprising:

simultaneously evaluating each required shape for the tolerance requirements of the connection condition in all planes of projection.

8. The method of claim 7, further comprising:

evaluating the tolerance requirement as a symmetrical or an asymmetrical tolerance range.

9. The method of claim 3, further comprising:

iteratively searching of parameters of the work piece without continuous transformation of the coordinate system into the three-dimensional space.

* * * * *